United States Patent
Kozora (12)

(10) Patent No.: US 6,497,120 B1
(45) Date of Patent: Dec. 24, 2002

(54) QUICK CHANGE CONNECTOR FOR PLUNGER FOR GLASS CONTAINER FORMING PROCESS AND EQUIPMENT

(76) Inventor: Joseph W. Kozora, 126 Whitaker La., Saxonburg, PA (US) 16056

( * ) Notice: Subject to any disclaimer, the term of this patent is extended or adjusted under 35 U.S.C. 154(b) by 239 days.

(21) Appl. No.: 09/713,724

(22) Filed: Nov. 15, 2000

(51) Int. Cl.$^7$ .......................... C03B 11/06; B21K 21/16; B23P 17/04; B23P 11/00; B23P 11/02
(52) U.S. Cl. .............................. 65/362; 65/171; 65/172; 29/428; 29/441.1
(58) Field of Search .......................... 65/305, 307, 321, 65/323, 362, 171, 172, 173; 29/441.1, 453, 428; 137/614.9, 114.01; 403/322.2, 325, 328

(56) References Cited

U.S. PATENT DOCUMENTS

| | | | |
|---|---|---|---|
| 4,033,744 A | | 7/1977 | Davis ........................... 65/362 |
| 4,098,292 A | * | 7/1978 | Evans .................... 137/614.04 |
| 4,213,482 A | * | 7/1980 | Gondek ................. 137/614.01 |
| 4,398,561 A | * | 8/1983 | Maldavs ..................... 137/614 |
| 4,608,075 A | * | 8/1986 | Trahan et al. ................. 65/172 |
| 4,623,374 A | * | 11/1986 | Doud et al. .................... 65/319 |
| 4,636,240 A | | 1/1987 | Kozora ......................... 65/229 |
| 4,659,357 A | * | 4/1987 | Doud ........................... 65/319 |
| 4,836,842 A | * | 6/1989 | Trahan ......................... 65/305 |
| 5,123,446 A | * | 6/1992 | Haunhorst et al. ........... 137/614 |
| 5,290,335 A | * | 3/1994 | Stewart ....................... 403/306 |
| 5,531,804 A | * | 7/1996 | Vajda .......................... 403/320 |
| 5,709,243 A | * | 1/1998 | Wells et al. ............. 137/614.01 |
| 6,056,010 A | * | 5/2000 | Wells .......................... 137/614 |
| 6,079,226 A | * | 6/2000 | Leidy ......................... 65/29.12 |
| 6,158,717 A | * | 12/2000 | Van Scyoc et al. ..... 137/614.02 |
| 6,237,631 B1 | * | 5/2001 | Giesler et al. ......... 137/614.04 |
| 6,286,339 B1 | * | 9/2001 | DiFrank ..................... 425/193 |

FOREIGN PATENT DOCUMENTS

| WO | WO 02/40194 A1 | * | 5/2002 | .......... B21K/21/16 |
|---|---|---|---|---|
| WO | WO 02/44035 A2 | * | 6/2002 | |

* cited by examiner

Primary Examiner—Steven P. Griffin
Assistant Examiner—Carlos Lopez
(74) Attorney, Agent, or Firm—Webb Ziesenheim Logsdon Orkin & Hanson, P.C.

(57) ABSTRACT

A plunger assembly for use in a glass bottle forming machine permitting quick exchange and self-aligning of a plunger held on a plunger driving piston comprising a plunger having an annular recess, an adapter having a plurality of stepped radial bores extending from a central bore into an annular groove, a plurality of retaining balls, one in each radial bore, a split ring sized to fit in the annular groove and an annular retaining spring for biasing the split ring and retaining balls in the annular groove in the plunger such that the plunger can be snapped into the adapter and held in place during bottle making.

11 Claims, 5 Drawing Sheets

QUICK CHANGE CONNECTOR FOR PLUNGER FOR GLASS CONTAINER FORMING PROCESS AND EQUIPMENT

FIELD OF THE INVENTION

This invention relates to equipment for the manufacture of glass containers and, more particularly, to the equipment associated with the formation of the parison in the blank mold of an I.S. (individual section) machine.

BACKGROUND OF THE INVENTION

During the initial stage of the formation of a glass container on an I.S. machine, a gob of molten glass is delivered to a blank mold. The gob is settled into the blank mold and a plunger is pressed into the center of the gob to form a hollow parison. An elongate plunger is pressed a substantial distance into the gob in the well-known press-and-blow process. In the well-known blow-and-blow process, a shorter plunger is pressed into the gob to form a pocket and is then withdrawn. Air is then forced into the pocket to form the hollow parison. In each process, the hollow parison is transferred to a final mold and blown into the final shape.

In either process, the press-and-blow process or the blow-and-blow-process, the plungers must be secured to a reciprocating piston. The plungers must be secured in a manner to align them with the axis of the piston, to be held so as not to wobble and to be easily connected and disconnected to and from the piston. Since the I.S. machines are designed to make many different bottle shapes and sizes, it is necessary to be able to remove and replace the plungers at the time the blank molds are changed to make a different style bottle.

Over the years, a number of plunger assemblies for securing the plungers to the reciprocating pistons have been considered. Perhaps the earliest plunger assembly is that described with reference to FIG. 1 of Davis U.S. Pat. No. 4,033,744 entitled "Plunger Assembly for a Glass Forming Machine." In that assembly, a plunger head is threaded to the end of the piston and the plunger is held on the plunger head by two split rings. The plunger assembly is located within a guide cylinder to maintain axial control of the plunger and to hold the split rings in position. The replacement of the plunger requires the removal of the guide cylinder followed by removal of the rings. The replacement plunger is then rested on the plunger head, the split rings are positioned, and the guide cylinder lowered over the split rings. Holding the plunger and split rings in place while positioning and lowering the guide cylinder is not an easy task. As the guide cylinder and guide rings wear, the alignment of the plunger is compromised and the plunger wobbles and air leaks. Applicant estimates that as much as 70% of the plunger assemblies in use today are of the split-ring type.

A considerable improvement over the split ring plunger assembly is the snap-on plunger assembly, for example, as described in the Davis patent. In that plunger assembly, the base of the plunger is provided with a plurality of ears which interlock with a plurality of flanges disposed within a recessed area within the plunger-type head. The ears and flanges are engaged by translating and rotating the plunger relative to its axis. A variation of the snap-on plunger assembly has been marketed by the Maul Bros. division of Maul Technology Corporation for over twenty years. The plunger must be slid perpendicular to its axis in order to engage the plunger head. Another snap-on plunger assembly is disclosed in Kozora U.S. Pat. No. 4,636,240 entitled "Plunger Assembly for Glass Container Manufacturing."

While the snap-on plunger assemblies were a considerable improvement over the split ring plunger assemblies, with wear, they still may permit wobble and air leakage.

Since most of the plungers in use were designed for use with the split-ring type plunger assemblies, there is a considerable resistance in the field to converting to a new type of plunger assembly.

It is an advantage, according to this invention, to provide an improved plunger assembly which is easily installed and uninstalled, which prevents wobble and is not subject to the wearing action that causes prior art plunger assemblies to wobble, and which can be used with easily retrofitted plungers designed for use in prior art plunger assemblies.

It is yet a further advantage that the plunger assembly provides an air and vacuum-tight seal between the plunger and the adapter fixed to the driving piston.

SUMMARY OF THE INVENTION

Briefly, according to this invention, there is provided a plunger assembly for use in a glass bottle forming machine permitting quick exchange and self-aligning of a plunger held on a plunger driving piston. The plunger assembly comprises: a plunger having a nose end, a cylindrical base end, and an annular contact surface perpendicular to the cylindrical axis of the cylindrical base end, the base end of the plunger defined by a cylindrical exterior surface having a diameter $d1$ and having an annular recess therein. Preferably, the annular recess has a surface being a portion of a toroidal surface defined by the rotation of a generating circle about the cylindrical axis of the cylindrical base, the generating circle having a diameters and the annular groove being spaced from the contact surface a distance $a1$. The plunger assembly further comprises an adapter having a cylindrical support end and a base end, the adapter being threaded to the driving piston at the base end thereof, the cylindrical support end of the adapter terminating in a contact surface perpendicular to the cylindrical axis of the adapter for receiving the contact surface of the plunger. A coaxial central bore is provided in the support end of the adapter defined by an internal cylindrical surface having a diameter $d3$ just sufficiently larger than $d1$ enabling receipt of the base end of the plunger. The support end of the adapter has an exterior cylindrical surface and an annular groove in the exterior cylindrical surface of the adapter. A plurality of stepped radial bores extend from the central bore into the annular groove. The axes of the radial bores are spaced a distance $a2$ from the contact surface. The distance $a2$ is substantially equal to distance $a1$. One in each of a plurality of retaining balls radial bore have a diameter $d4$ substantially equal to, the diameter of the generating circle. A split ring is sized to fit in the annular groove in the exterior cylindrical surface of the adapter. The split ring has an internal diameter such that when the internal diameter bears upon the retaining balls, the retaining balls may be seated in the annular recess in the cylindrical base of the plunger.

An annular retaining spring biases the split ring and retaining balls in the annular groove in the cylindrical base of the plunger such that the plunger can be snapped into the adapter and held in place during bottle making.

DESCRIPTION OF THE PREFERRED EMBODIMENTS

Figure 1:
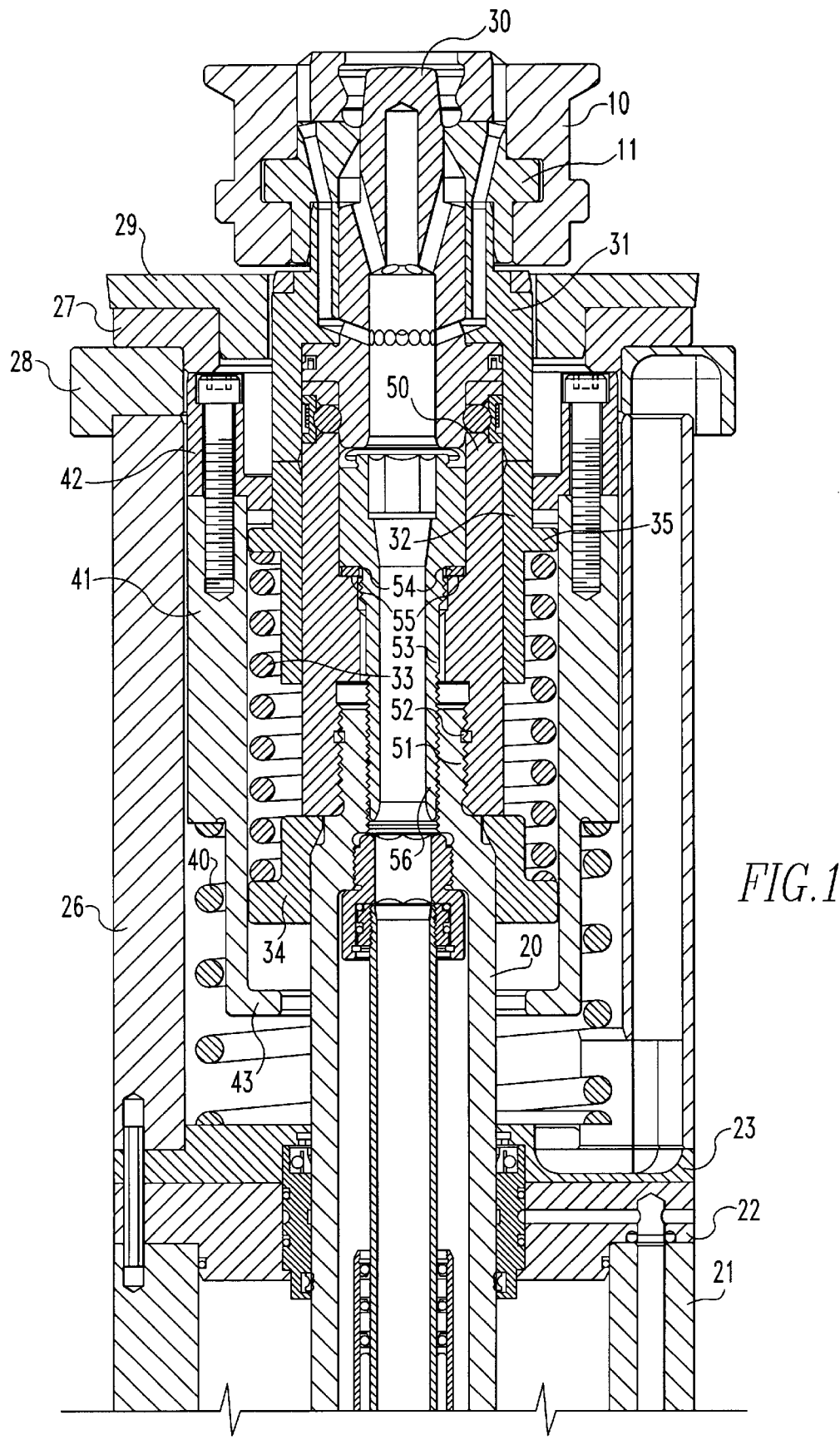
FIG. 1 is a section view of a plunger assembly according to this invention and the surrounding portions of apparatus for actuating the plunger.

Referring now to FIG. 1, there is shown a plunger assembly and portions of the cylinder assembly that actuate the plunger. In FIG. 1, a blow-and-blow plunger is illustrated. However, it should be understood that the plunger assembly, according to this invention, works equally well with a press-and-blow plunger. A more detailed description of the particular cylinder assembly, portions of which are shown in FIG. 1, is set forth in Kozora U.S. Pat. No. 5,358,543 entitled "Air Tube Structure in a Glass Container Forming Machine."

In the I.S. process, a gob of molten glass is formed into a hollow parison in a neck ring and blank mold. The blank mold is then removed and the neck ring is used to move the parison to a finishing mold where it is blown to fill out into a finishing mold. The formation of the hollow parison requires that a plunger be inserted into the gob in the blank mold. Referring to FIG. 1, the neck ring 10 is shown positioned above the plunger cylinder assembly which comprises the plunger cylinder for pneumatically causing upward movement of the piston rod 20. The plunger cylinder assembly comprises the piston cylinder 21, intermediate cap 22, and tie plate 23. Held in place on the tie plate 23 is the positioner mount assembly which includes the positioner mount cylinder 26, annular cap 27, and deflector ring 28 bolted thereto (bolts not shown). Dust cover 29 sits on the deflector ring 28. During parison formation, the neck ring 10 is held above the cap 27 by the guide plate 11. During parison formation, a mold (not shown) is positioned over the neck ring 10.

The positioner mount cylinder 26 is positioned above the piston cylinder 21. The piston rod 20 moves through the intermediate cap assembly 22 from the piston cylinder into the positioner mount cylinder.

A plunger 30 and thimble 31 pass within the opening in the annular cap 27 and, depending on the parison forming cycle, move into and out of the neck ring 10 and mold (not shown) as further explained.

The plunger 30 and thimble 31 are moved up and down by the translation of the piston rod 20 through a lost motion mechanism involving the compression and expansion of large spring 40 and thimble lock spring 33. In this way, the plunger 30 and thimble 31 advance at different times and for different distances into and out of the neck ring 10.

Sliding within the positioner mount cylinder 26 is hollow cylindrical piston 41 and piston cap 42 bolted thereto. Large spring 40 urges the piston 41 up against the annular cap 27 on the top of the positioner mount cylinder 26.

Reciprocating within the cylindrical piston 41, the thimble 31 and thimble lock 32 are urged away from the piston rod by thimble lock spring 33. The thimble lock spring 33 is captured between the lock spring piston 34 bearing on the piston rod 20 and an annular flange 35 on the thimble lock 32.

During operation, the plunger and thimble can take a number of positions depending on the particular operation and especially depending on whether the press-and-blow process or the blow-and-blow process is being used. Typical positions include "full-up", "full-down", "jump-to-load", and "pressing" positions.

The thimble 31 moves into the neck ring 10 when the piston is raised to the "full-up" operating position. The thimble 31 moves into the neck ring 10 when the piston rod 20 is moved sufficiently upward so that the lock spring piston 34 disengages the radial flange 43 at the bottom of the cylindrical piston 41. In the "full-down" position, the plunger and the thimble are at their most retracted positions and the thimble is moved out of engagement with the neck ring. At "full-down", the large spring 40 is at maximum compression due to the downward movement of the piston rod. In the "jump-to-load" position, the piston rod moves up and the large spring 40 carries the thimble 31 into the neck ring 10. In the "pressing" position, the plunger moves into the gob and the neck ring. In the pressing position, the large spring 40 is at maximum expansion and the thimble lock spring 33 is compressed. In the press-and-blow process, the plunger moves deeper into the gob and mold to form the cavity in the parison. In the blow-and-blow process, the plunger is partially retracted and compressed air is forced into the interior of the gob to form the cavity in the parison. In the "loading" position, the piston rod 20 is placed at its maximum up position enabling change of both the thimble and the plunger. In this position, the thimble lock spring 33 is at maximum compression.

Up to this point under the next above heading, the environment of the present invention, which is typical for the parison forming in I.S. machines, has been described. The improvement disclosed herein is set forth hereafter.

The plunger 30 is connected to the piston rod 20 indirectly through the adapter 50. The adapter 50 is connected to the piston rod 20 by threads engaging external threads 51 on the piston rod 20 held fast by an anti-spin ring 52. The adapter is also held to the piston rod 20 by locking stud 53 which compresses Belleville washer 54 against the annular step 55 in the adapter 50. The locking stud 53 engages internal threads 56 in the piston rod 20.

The plunger 30 is connected to the adapter 50 by the ball locking mechanism carried by the adapter 50. The ball locking mechanism permits quick exchange and self-aligning of a plunger held on the adapter 50.

Figure 2:
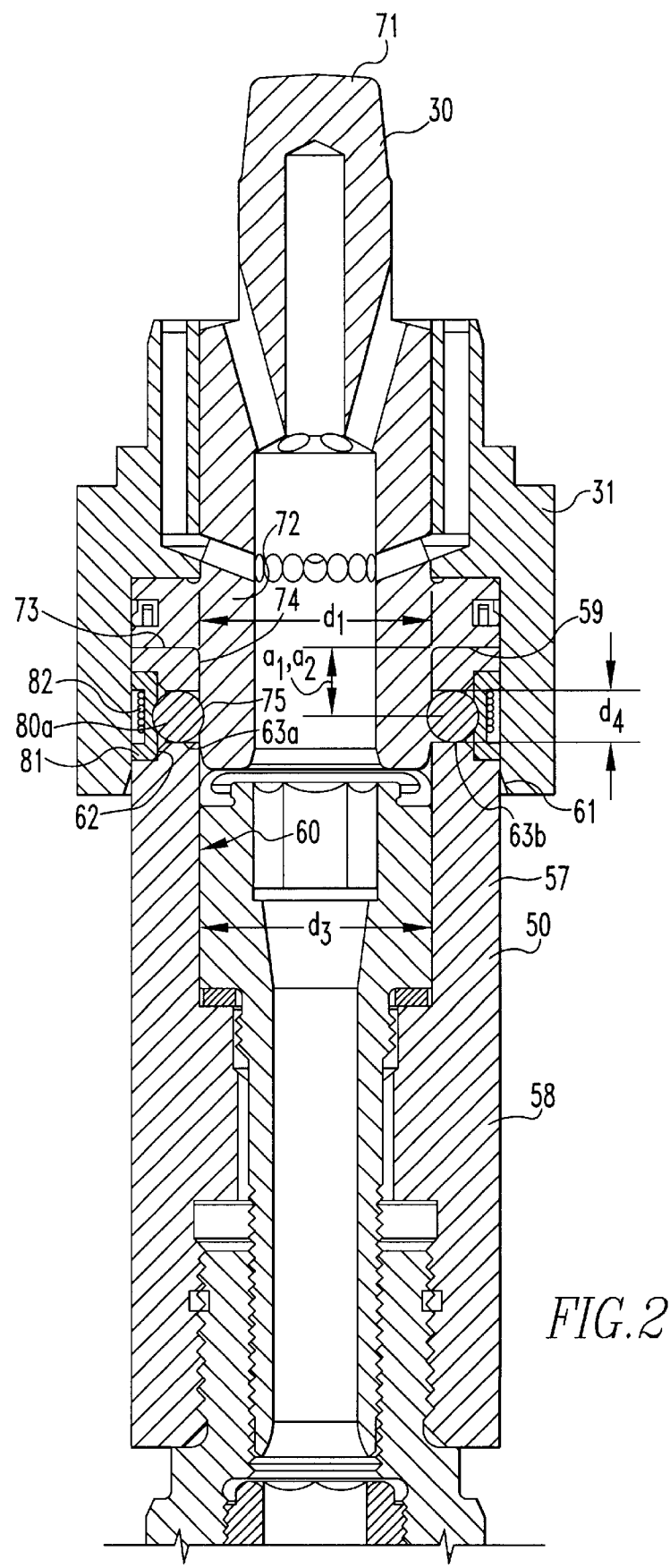
FIG. 2 is an enlarged section of the plunger assembly according to this invention.
Figure 4:
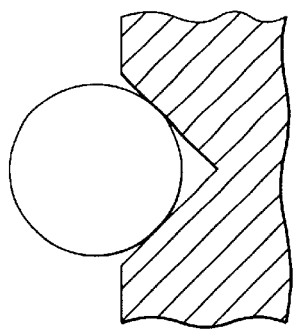
FIGS. 4, 5, and 6 illustrate alternate configurations for the recess in the base end of the plunger.
Figure 5:
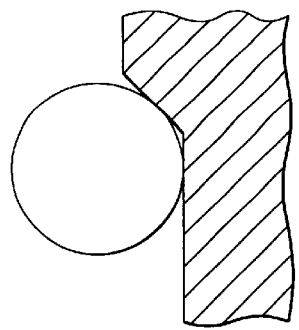
Figure 6:
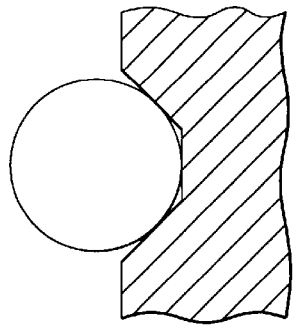

Referring to FIG. 2, the plunger has a nose end 71 and a cylindrical base end 72. Intermediate the nose 71 and the base end 72, the plunger has a contact surface 73 which is perpendicular to the cylindrical axis of the cylindrical base end 72. This is a precisely machined surface, the accuracy of which determines the accuracy of the alignment of the plunger when installed. The base end 72 of the plunger is defined by a cylindrical exterior surface 74 having a diameter d1. Annular grooves 75 are cut in the cylindrical surface 74. The surfaces of the annular grooves 75 are portions of a toroidal surface defined by a generating circle maintained in a plane including the cylindrical axis of the cylindrical base and rotated thereabout. The generating circle has a diameter. In a prototype, the diameter of the generating circle d2 is 0.250 inch and the depth of the groove is 0.020 inch. The annular grooves 75 are precisely spaced from the contact surface 73 a distance a1. That distance is measured to the center and deepest portion of the grooves 75. It should be understood that annular grooves with toroidal surfaces are preferred, however, the grooves may be replaced with a recess comprised of conical and cylindrical surfaces, such as shown in FIGS. 4, 5, and 6.

Referring again to FIG. 2, the adapter 50 has a cylindrical support end 57 and a base end 58. The adapter is threaded to the driving piston at the base end. The cylindrical support end terminates in a contact surface 59 which is perpendicular to the cylindrical axis of the adapter 50 for receiving the contact surface 73 of the plunger. Like the contact surface 73 of the plunger, this surface 59 also must be precisely machined. The contact surface 59 and the contact surface 73, when pressed together, form a substantially air and vacuum-tight seal. A coaxial central bore 60 in the support end of the adapter 50 has an internal cylindrical surface with a diameter d3 just sufficiently larger than the diameter d1 of the plunger to enable receipt of the base end 72 of the plunger. The support end 57 of the adapter 50 has an exterior cylindrical surface 61. An annular groove 62 is provided in the exterior cylindrical surface 61 of the adapter 50. A plurality of stepped radial bores 63a, 63b extend from the central bore 60 into the annular groove 62. The axes of the radial bores are all in the same plane spaced a distance a2 from the contact surface 59, the distance a2 being substantially equal to distance a1 between the contact surface 73 and the groove 62 on the plunger. Preferably, there are four bores spaced precisely 90 degrees apart. The number of bores can vary from no less than three up to about ten for large plungers. The number is dictated in large measure by the space available. The bores have a diameter upon entering the annular grooves 75 to allow a sliding fit of retaining balls 80a, 80b. The bores have a reduced cross section on the end adjacent bore 60 to prevent the retaining balls from passing entirely through the bores. The retaining balls must be able to pass partially into the bore 60. The retaining balls are preferably made of chrome steel and have a precise spherical shape. The diameter d4 of the balls should be substantially the same as the diameter of the grooves 75 in the base of the plunger. In a prototype, the balls had a diameter of 0.250 inch.

A split ring 81 is sized to fit in the annular groove 62 in the exterior cylindrical surface 61 of the adapter. The split ring 81 has an internal diameter such that when the internal surface bears upon the retaining balls 80a, 80b, the retaining balls may be seated in the annular grooves 75 in the cylindrical base of the plunger. Preferably, the split ring 81 has at least three sections. The split ring 81 may have more sections, but the more sections the more difficult the assembly will be. An annular retaining spring 82 biases the split ring 81 and retaining balls 80a, 80b in the annular grooves 75. The retaining spring 82 enables the plunger to be snapped into the adapter and held snugly in place during bottle making. The retaining spring 82 can take several forms. A simple spring wire helical spring wrapped around the outer circumference of the split ring has been found suitable. An advantage of the helical spring is that the spring tension can be adjusted by cutting away turns until the plunger can be just snapped into the adapter by hand. This will provide enough compression on the split ring and balls to pull the contact surfaces 59 and 73 tightly together assuring proper alignment of the plunger. Variations of the spring wire helical spring are contemplated. Certain helical springs with flat radial surfaces designed for use as retaining rings may be used. Still further, resilient rings with a Z-cut may be used.

Preferably, the annular groove 62 is sufficiently deep such that the retaining spring 82 and split ring 81 are totally seated in the groove. In this way, they do not bear upon the opposed surface of the thimble 31 protecting both from wear. However, it should be understood that should the spring 82 fail, the clearance between the split ring 81 and the inner cylindrical surface of the thimble 31 will not permit the balls 80a, 80b to completely back out of the grooves 75 providing additional safety.

Plungers designed for other plunger assemblies can be easily modified to work with the above-described plunger assemblies. The base end of the old plunger is turned down to remove radial flanges and ears and a hard steel ring with the groove for receipt of the locking balls machined therein is shrink fit onto the turned down end of the old plunger.

Once the plunger has been inserted in the adapter and the balls have entered the annular groove, the plunger is held fast to the adapter whether the plunger is being moved into the parison or is being withdrawn. This is a significant advantage over prior art plunger assemblies of either the split ring or snap-on plunger type since each permits a slight separation on withdrawal. This can result in the lip of the parison being tapped by the plunger after separation causing dangerous defects in the lip of the completed bottle.

Figure 3:
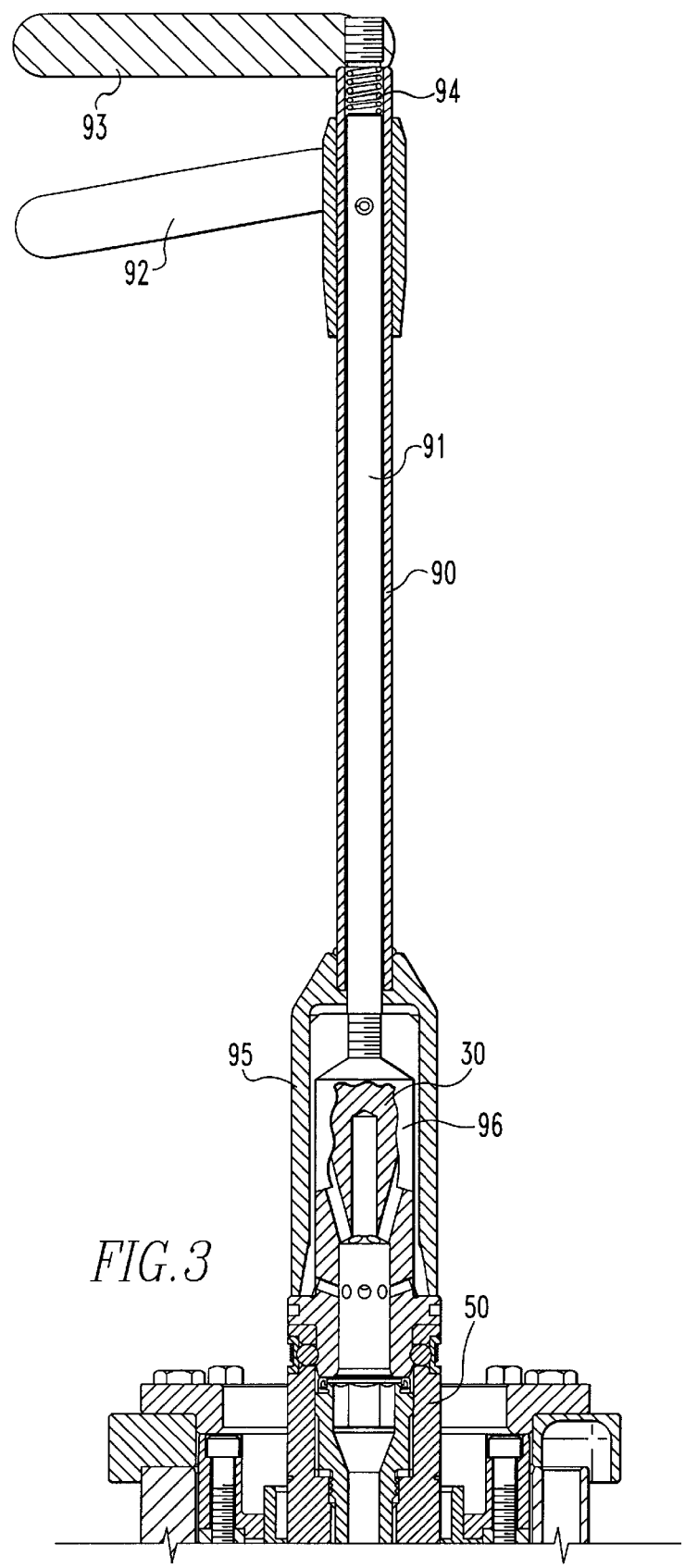
FIG. 3 is a drawing of a tool for inserting or removing a plunger into the adapter with the plunger in the "loading" position.

Referring to FIG. 3, the plunger 30 and adapter 50 are shown in the "loading" position with a mounting and dismounting tool grasping the plunger. The thimble 31 has been removed and the upper portion of the plunger 30 exposed. The split ring 81 has also been exposed by removal of the thimble 31. A tool for mounting and dismounting the plunger has a hollow shaft 90 with a rod 91 that rides axially therein. The rod is displaceable relative to the shaft by grips 92 and 93. The rod is biased downwardly within the shaft by a spring 94. Attached at the lower end of the shaft 90 is a first cup 95. Within the first cup and attached to rod 91 is a second cup which is split in radial sections. At the lower end, the first cup 95 is provided with a conical interior surface. The lower end of the second cup 96 is provided with a conical exterior surface. When the grips 92 and 93 are squeezed together, the rod 91 pulls the second cup 96 upwardly. The conical surfaces engage and squeeze the lower end of the second cup against the plunger enabling removal. The tool is handy because at the time of removal, the plungers are too hot to be handled easily and the location is often difficult to reach. With a strong pull upward, the balls overcome the bias of spring 82 and ride out of the groove at the base of the plunger allowing removal. The plunger assembly disclosed herein enables the use of the just-described mounting and dismounting tool because only axial movement is required to engage or disengage the plunger. No radial movement is required as with the snap-on plunger assembly disclosed in the Davis patent.

Figure 9:
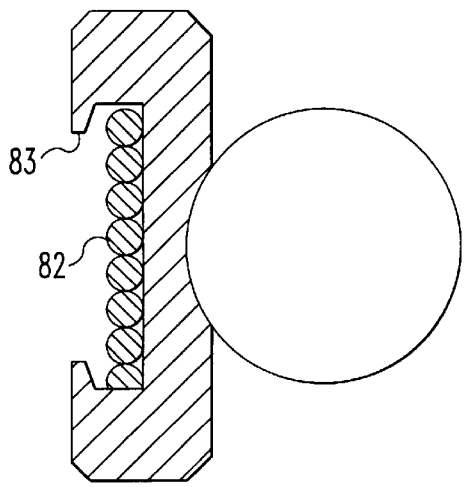
FIGS. 8 and 9 are preferred cross sections of the split ring shown in FIG. 7.
Figure 8:
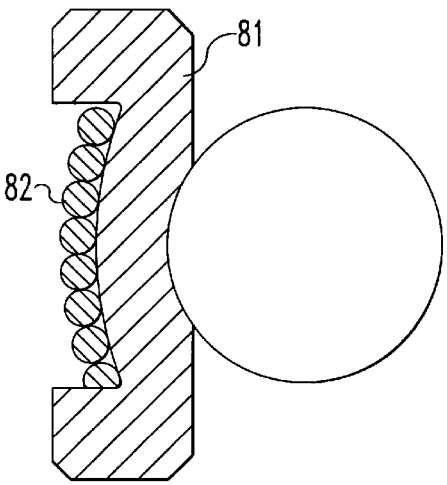
Figure 7:
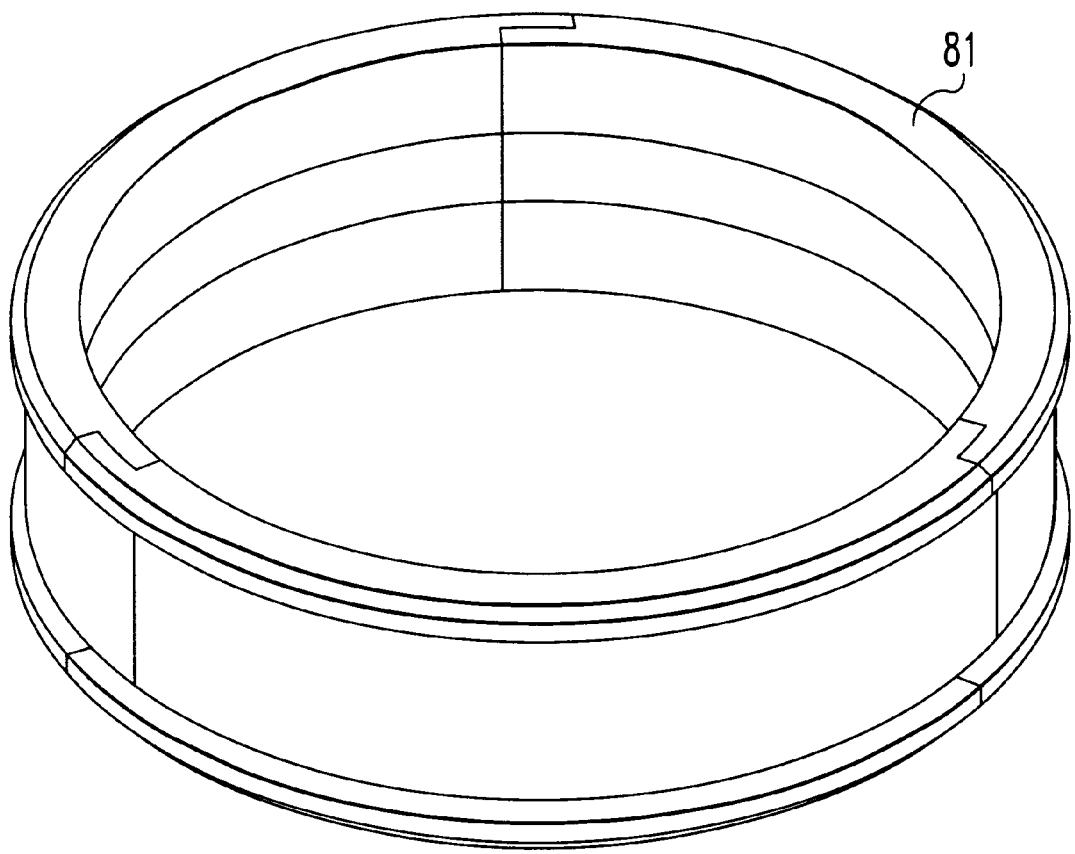
FIG. 7 is a perspective view of a preferred split ring with three Z-cuts.

Referring to FIGS. 7, 8, and 9, preferred constructions of the split ring are illustrated. The curved surface for supporting the spring 82 assists in holding the ends of the coil springs in place. The lips 83 shown in FIG. 9 serve the same purpose. It is preferable that the number of separate segments forming the split ring be one less than the number of balls 80a, 80b held in place by the split ring. In this way, no more than one ball can ever rest upon a joint between segments.

Having thus described my invention with the detail and particularity required by the Patent Laws, what is desired protected by Letters Patent is set forth in the following claims.

What is claimed is:

1. A plunger assembly for use in a glass bottle forming machine permitting quick exchange and self-aligning of a plunger held on a plunger driving piston comprising:
    a plunger having a nose end, a cylindrical base end, and a contact surface perpendicular to the cylindrical axis of the cylindrical base end, said base end of said plunger defined by a cylindrical exterior surface and having an annular recess therein, the annular recess being spaced from the contact surface a distance;
    an adapter having a cylindrical support end and a base end, said adapter threaded to the driving piston at the base end thereof, said cylindrical support end terminating in a contact surface perpendicular to the cylindrical axis of the adapter for receiving the contact surface of the plunger, a coaxial central bore in the support end of the adapter defined by an internal cylindrical surface having a diameter enabling receipt of the base end of the plunger, said support end of the adapter having an exterior cylindrical surface, an annular groove in the exterior cylindrical surface of the adapter, a plurality of stepped radial bores extending from the central bore into the annular groove, the axes of the radial bores being spaced from the contact surface;

a plurality of retaining balls, one in each radial bore;

a split ring sized to fit in the annular groove in the exterior cylindrical surface of the adapter, said split ring having an internal diameter such that when the internal diameter bears upon the retaining balls, the retaining balls may be seated in the annular groove in the cylindrical base of the plunger; and an annular retaining spring for biasing the split ring and retaining balls in the annular groove in the cylindrical base of the plunger such that the plunger can be snapped into the adapter and held in place during bottle making.

2. A plunger assembly for use in a glass bottle forming machine permitting quick exchange and self-aligning of a plunger held on a plunger driving piston comprising:

a plunger having a nose end, a cylindrical base end, and an annular contact surface perpendicular to the cylindrical axis of the cylindrical base end, the base end of the plunger defined by a cylindrical exterior surface having a diameter (d1) and having an annular groove therein, the surface of said annular groove being a portion of a toroidal surface defined by the rotation of a generating circle about the cylindrical axis of the cylindrical base, the generating circle having a diameter the annular groove being spaced from the contact surface a distance (a1);

adapter having a cylindrical support end and a base end, said adapter threaded to the driving piston at the base end thereof, said cylindrical support end terminating in a contact surface perpendicular to the cylindrical axis of the adapter for receiving the contact surface of the plunger, a coaxial central bore in the support end of the adapter defined by an internal cylindrical surface having a diameter (d3) just sufficiently larger than diameter (d1) enabling receipt of the base end of the plunger, said support end of the adapter having an exterior cylindrical surface, an annular groove in the exterior cylindrical surface of the adapter, a plurality of stepped radial bores extending from the central bore into the annular groove, the axes of the radial bores being spaced a distance (a2) from the contact surface, distance (a2) being substantially equal to distance (a1).

a plurality of retaining balls, one in each radial bore, said retaining balls having a diameter (d4) substantially equal to the diameter of the generating circle a split ring sized to fit in the annular groove in the exterior cylindrical surface of the adapter, said split ring having an internal diameter such that when the internal diameter bears upon the retaining balls, the retaining balls may be seated in the annular groove in the cylindrical base of the plunger; and an annular retaining spring for biasing the split ring and retaining balls in the annular groove in the cylindrical base of the plunger such that the plunger can be snapped into the adapter and held in place during bottle making.

3. The plunger assembly according to claim 1 or 2, wherein the retaining spring is a spring wire helical spring wrapped around the split ring.

4. The plunger assembly according to claim 1 or 2, wherein there are at least three stepped radial bores equally angularly spaced from each other.

5. The plunger assembly according to claim 1 or 2, wherein there are at least four stepped radial bores spaced 90 degrees from each other.

6. The plunger assembly according to claim 1 or 2, wherein the split ring is divided into at least three equal sized segments.

7. The plunger assembly according to claim 1 or 2, wherein the retaining balls are spherical and fabricated from chrome steel.

8. A self-aligning snap-on connection between two axially aligned parts comprising:

a first part having a cylindrical base end, said base end supporting an annular contact surface perpendicular to the cylindrical axis of the cylindrical base end, the base end of the first part defined by a cylindrical exterior surface having a diameter (d1) and having an annular groove therein, the surface of said annular groove being a portion of a toroidal surface defined by the rotation of a generating circle about the cylindrical axis of the cylindrical base, the generating circle having a diameter the annular groove being spaced from the contact surface a distance (a1);

a second part having a cylindrical support end, said cylindrical support end terminating in a contact surface perpendicular to the cylindrical axis of the second part for receiving the contact surface of the first part, a coaxial central bore in the support end of the second part defined by an internal cylindrical surface having a diameter (d3) just sufficiently larger than (d1) enabling receipt of the base end of the first part, said support end of the second part having an exterior cylindrical surface, an annular groove in the exterior cylindrical surface of the second part, a plurality of stepped radial bores extending from the central bore into the annular groove, the axes of the radial bores being spaced a distance (a2) from the contact surface, distance (a2) being substantially equal to distance (a1);

a plurality of retaining balls, one in each radial bore, said retaining balls having a diameter (d4) substantially equal to the diameter of the generating circle;

a split ring sized to fit in the annular groove in the exterior cylindrical surface of the second part, said split ring having an internal diameter such that when the internal diameter bears upon the retaining balls, the retaining balls may be seated in the annular groove in the cylindrical base of the plunger; and an annular retaining spring for biasing the split ring and retaining balls in the annular groove in the cylindrical base of the first part such that the first part can be snapped into the adapter and held in axial alignment.

9. The snap-on connection according to claim 8, wherein the retaining spring is a spring wire helical spring wrapped around the split ring.

10. The snap-on connection according to claim 8, wherein there are at least three stepped radial bores equally angularly spaced from each other.

11. The snap-on connection according to claim 8, wherein there are at least four stepped radial bores spaced 90 degrees from each other.

* * * * *

UNITED STATES PATENT AND TRADEMARK OFFICE
CERTIFICATE OF CORRECTION

PATENT NO.     : 6,497,120 B1
DATED          : December 24, 2002
INVENTOR(S)    : Joseph W. Kozora It is certified that error appears in the above-identified patent and that said Letters Patent is hereby corrected as shown below:

Column 2,
Line 32, "having a diameters" should read -- having a diameter --.

Column 4,
Line 61, "circle d2 is" should read -- circle is --.

Column 7,
Line 39, "adapter having" should read -- an adapter having --.
Line 53, after "equal to distance (a1)" delete period and insert semicolon (;).
Line 56, after "generating circle" insert semicolon (;).

Column 8,
Lines 26-27, "diameter the" should read -- diameter, the --.

Signed and Sealed this

Tenth Day of June, 2003

JAMES E. ROGAN
*Director of the United States Patent and Trademark Office*